United States Patent [19]

Ikegami et al.

[11] Patent Number: 4,677,585
[45] Date of Patent: Jun. 30, 1987

[54] METHOD FOR OBTAINING COMMON MODE INFORMATION AND COMMON FIELD ATTRIBUTE INFORMATION FOR A PLURALITY OF CARD IMAGES

[75] Inventors: Yoshiki Ikegami, Inagi; Yasuaki Sato, Sagamihara; Mitsutoshi Ishimaru, Inagi, all of Japan

[73] Assignee: Fujitsu Limited, Kawasaki, Japan

[21] Appl. No.: 809,853

[22] Filed: Dec. 18, 1985

Related U.S. Application Data

[63] Continuation of Ser. No. 540,682, Oct. 11, 1983, abandoned.

[30] Foreign Application Priority Data

Oct. 11, 1982 [JP] Japan ................. 57-177803

[51] Int. Cl.$^4$ .................. G06F 15/00; G06F 3/00
[52] U.S. Cl. .................. 364/900; 382/61; 340/734; 400/83; 400/279
[58] Field of Search ... 364/200 MS File, 900 MS File; 382/61; 340/734; 400/76, 83, 279, 282

[56] References Cited

U.S. PATENT DOCUMENTS

| | | | |
|---|---|---|---|
| Re. 29,104 | 1/1977 | Shepard | 382/61 |
| 3,763,467 | 10/1973 | Cash et al. | 382/61 X |
| 3,872,462 | 3/1975 | Lemelson | 340/705 |
| 4,141,001 | 2/1979 | Suzuki et al. | 340/711 |
| 4,291,305 | 9/1981 | Kimura et al. | 340/73 X |
| 4,314,357 | 2/1982 | Kimura et al. | 340/799 X |
| 4,360,884 | 11/1982 | Okada et al. | 364/521 |
| 4,375,079 | 2/1983 | Ricketts et al. | 364/518 |
| 4,504,969 | 3/1985 | Suzuki et al. | 382/61 X |
| 4,542,378 | 9/1985 | Suganuma et al. | 382/61 X |
| 4,566,127 | 1/1986 | Sekiya et al. | 382/61 X |

Primary Examiner—Archie E. Williams
Assistant Examiner—Thomas C. Lee
Attorney, Agent, or Firm—Staas & Halsey

[57] ABSTRACT

In a method for obtaining common mode information and common field attribute information for a plurality of card images belonging to a "box" in a data processing system, fixed information and field indicating information are written into a mode image buffer and the content of the mode image buffer is displayed on a display unit. The field indicating information written into the mode image buffer is analyzed to make field definition information tables, and a field name, for each field, is detected to make a field name table. By sorting and merging the contents of the field definition information tables and the field name table, a blank form is made.

8 Claims, 40 Drawing Figures

Fig. 1

| CUSTOMER CARD | | YR MO DAY |
|---|---|---|

| CUSTOMER NO. | uuuuuuu |
|---|---|

| CUSTOMER'S NAME | . . . . . . . . . . . . . . . . |
|---|---|
| ADDRESS | . . . . . . . . . . . . . . . .<br>. . . . . . . . . . . . . . . . |
| PHONE | . . . . . . . . . . . . . . . . |
| AGE | uuuu |
| NAME | . . . . . . . . . . . . . . . . |

Fig. 2

| DELIVERY OF GOODS | | | YR MO DAY | NAME |
|---|---|---|---|---|
| MESSERS FUJITSU TRADING | | | ⊓⊓ ⊓⊓ ⊓⊓ | · · |

| ARTICLE | QUANTITY | UNIT PRICE | AMOUNT |
|---|---|---|---|
| · · · · · | ⊓⊓⊓⊓⊓⊓⊓⊓ | ⊓⊓⊓,⊓⊓⊓,⊓⊓⊓ | ⊓⊓⊓,⊓⊓⊓,⊓⊓⊓,⊓⊓⊓ |
| · · · · · | ⊓⊓⊓⊓⊓⊓⊓⊓ | ⊓⊓⊓,⊓⊓⊓,⊓⊓⊓ | ⊓⊓⊓,⊓⊓⊓,⊓⊓⊓,⊓⊓⊓ |
| · · · · · | ⊓⊓⊓⊓⊓⊓⊓⊓ | ⊓⊓⊓,⊓⊓⊓,⊓⊓⊓ | ⊓⊓⊓,⊓⊓⊓,⊓⊓⊓,⊓⊓⊓ |
| · · · · · | ⊓⊓⊓⊓⊓⊓⊓⊓ | ⊓⊓⊓,⊓⊓⊓,⊓⊓⊓ | ⊓⊓⊓,⊓⊓⊓,⊓⊓⊓,⊓⊓⊓ |
| | | TOTAL | ⊓⊓⊓,⊓⊓⊓,⊓⊓⊓,⊓⊓⊓ |

Fig. 5

| CUSTOMER CARD | | YR MO DAY |
|---|---|---|
| CUSTOMER NO. | ⊔⊔⊔⊔⊔⊔⊔ | |

| CUSTOMER NAME | |
|---|---|
| ADDRESS | |
| PHONE | |
| AGE | ⊔⊔⊔⊔ |
| NAME | |

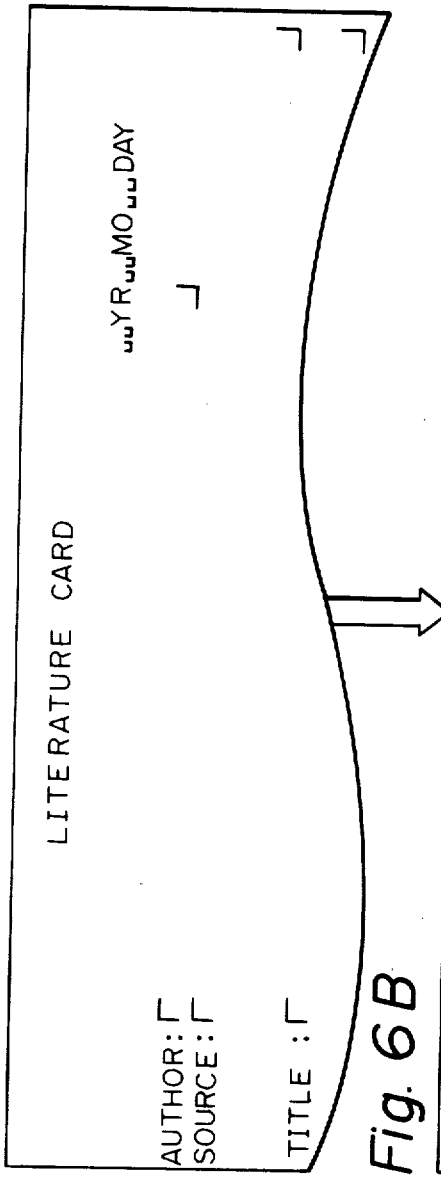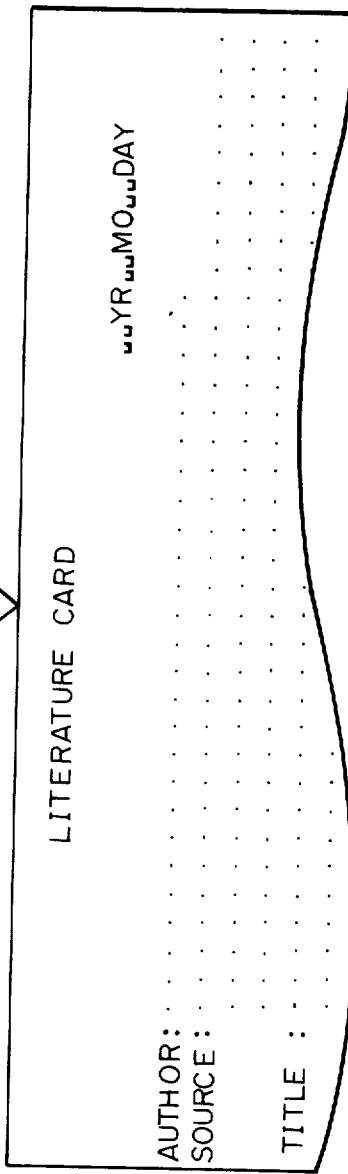
Fig. 6A
Fig. 6B

Fig. 7A

| HEADING 1 | HEADING 2 | HEADING 3 |
|---|---|---|
| ⌐      ⌐ | uu,uuu,uuu | uuuuuuu |
|  |  |  |
|  |  |  |
|  |  |  |

▼ TABLE START MARK
▲ TABLE END MARK

Fig. 7B

| HEADING 1 | HEADING 2 | HEADING 3 |
|---|---|---|
| . . . . . . . | uu,uuu,uuu | uuuuuuu |
| . . . . . . . | uu,uuu,uuu<br>uu,uuu,uuu | uuuuuuu<br>uuuuuuu |
| . . . . . . . | uu,uuu,uuu | uuuuuuu |
| . . . . . . . | uu,uuu,uuu | uuuuuuu |

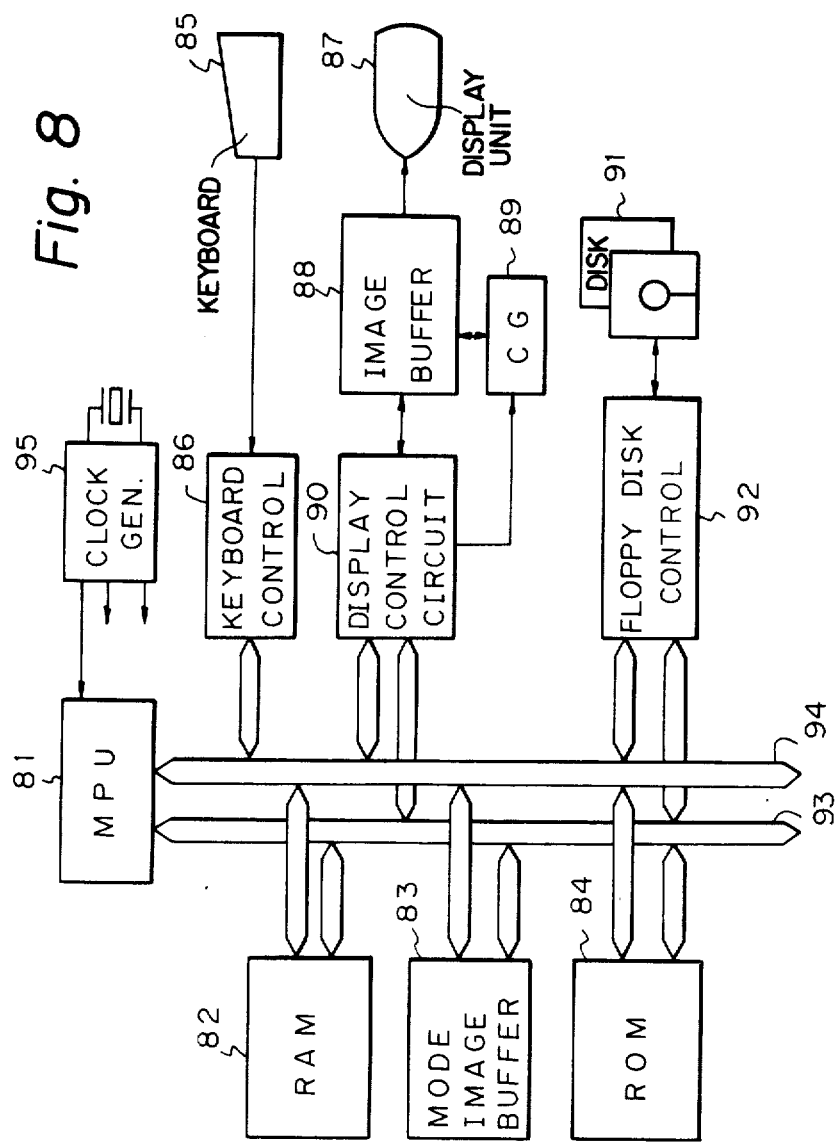

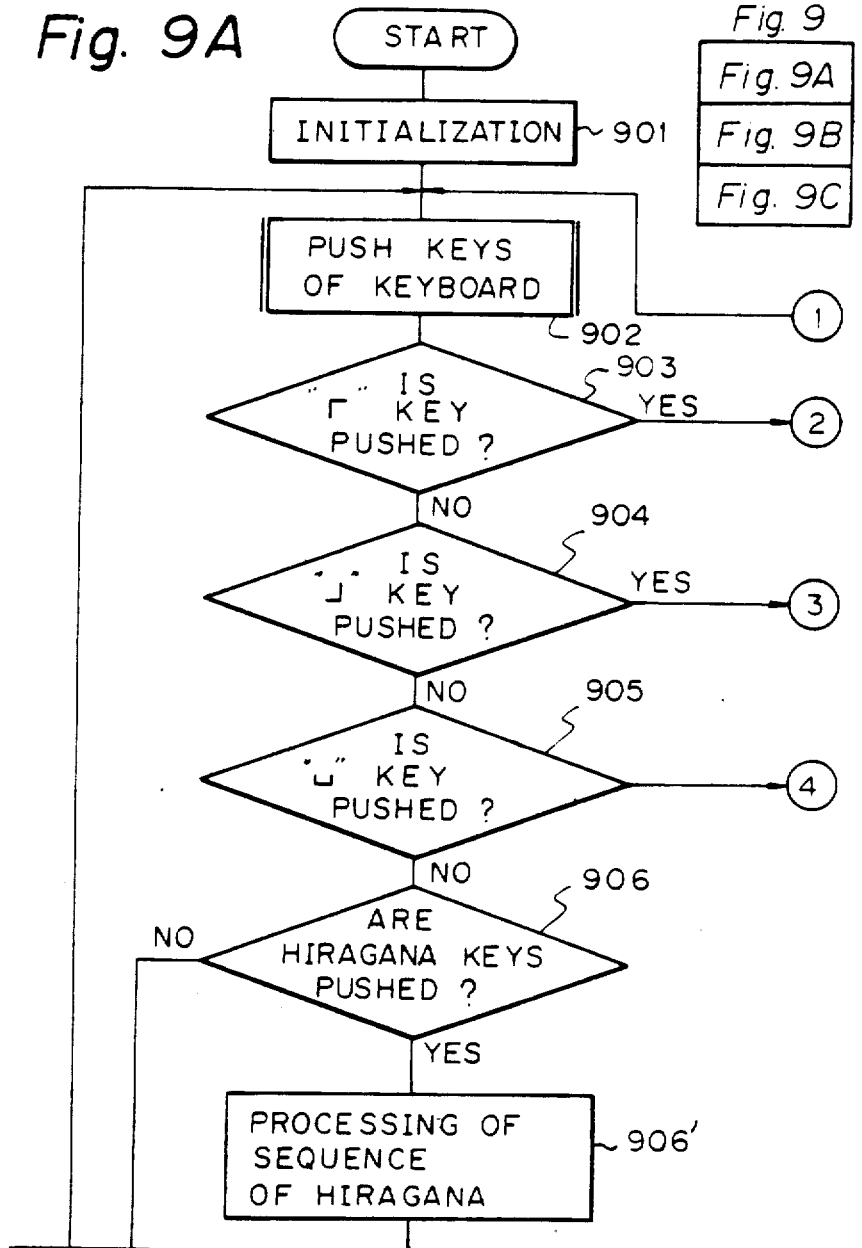

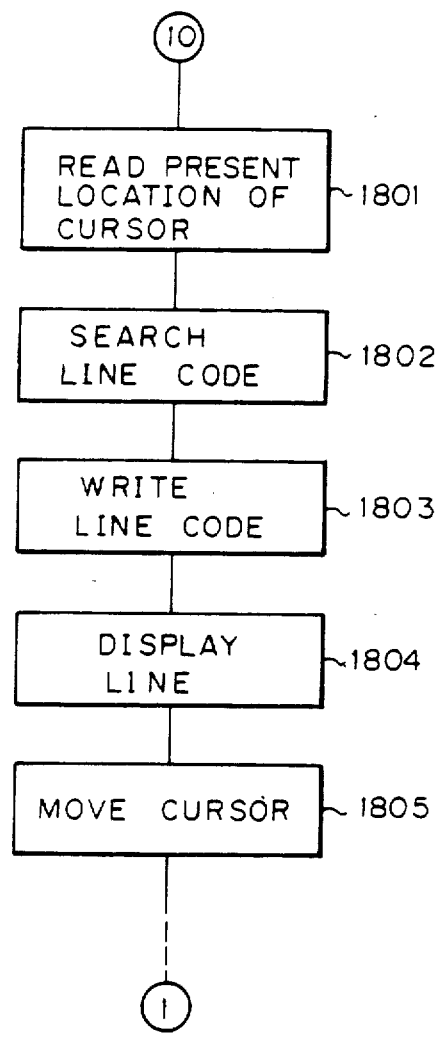
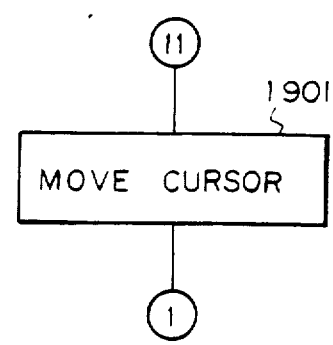
Fig. 18
Fig. 19

Fig. 21A

CHARACTER FIELD DEFINITION TABLE ~T1

| COORDINATES OF "ロ" | COORDINATES OF "⌐" | COMPLETE FLAG |
|---|---|---|
| (10, 5) | (10, 10) | "1" |
| (12, 1) | (X₂, Y₂) | "0" |
| (13, 1) | | "0" |
| | | "0" |
| | | "0" |

P1
SPACE ENTRY POINTER

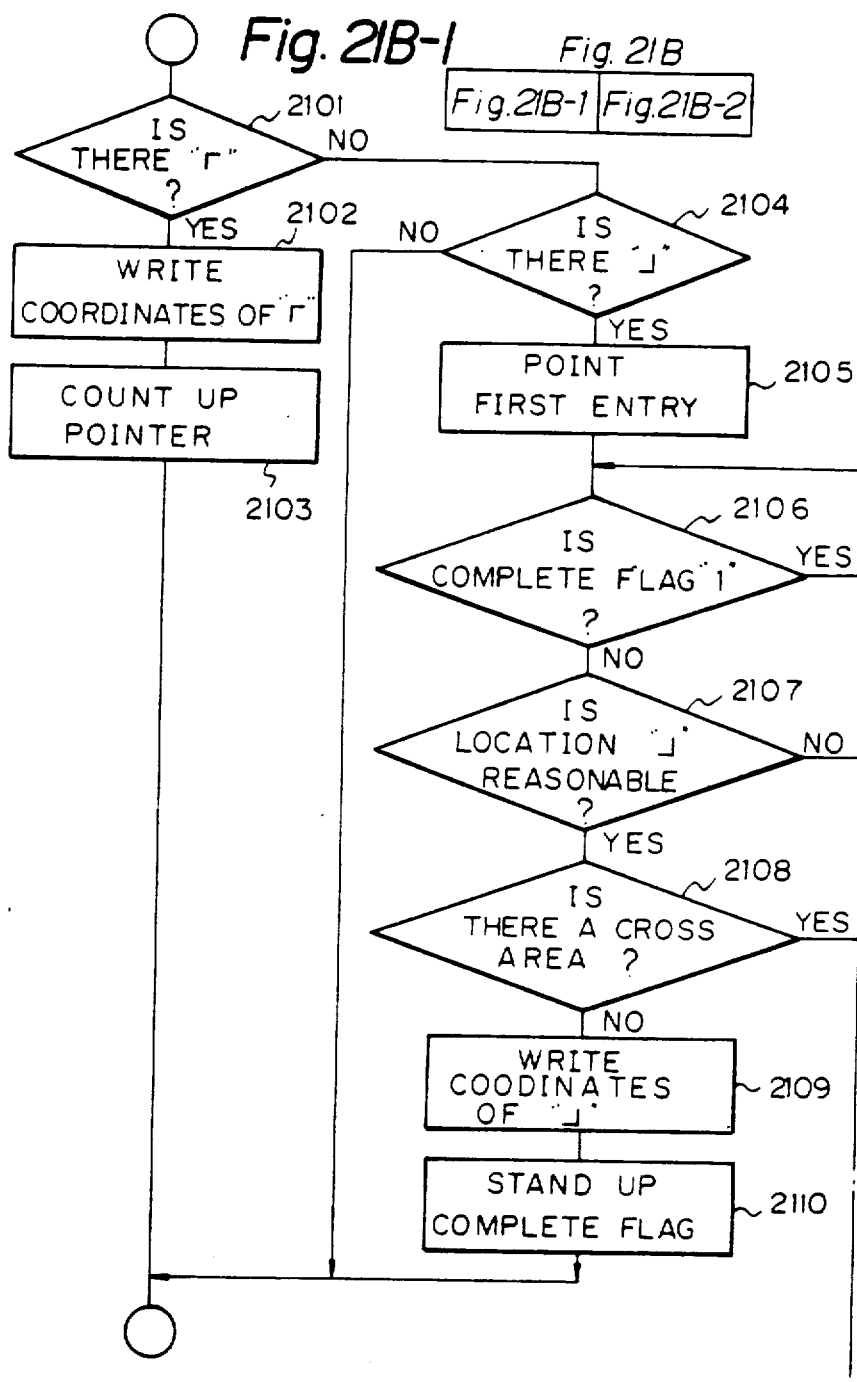

Fig. 23

INDEPENDENT FIELD DEFINITION TABLE

| ADDRESS | START COORDINATES | CHRACTER /NUMERIC | NUMBER OF ROWS | NUMBER OF COLUMNS | COMMA | DECIMAL PLACES |
|---|---|---|---|---|---|---|
| | | | | | | |
| | | | | | | |
| | | | | | | |
| | | | | | | |
| | | | | | | |
| | | | | | | |

$T_3$

| START Y-COORDINATE | END Y-COORDINATE |
|---|---|
|  |  |
|  |  |
|  |  |

T4

ROW TABLE

ROW 1
ROW 3
ROW 5
ROW 6
ROW 8

REPEATED FIELD DEFINITION TABLE    T₆

| START Y-COORDINATE | END Y-COORDINATE | Y-DIRECTION ATTRIBUTE LIST | X-DIRECTION ATTRIBUTE LIST |
|---|---|---|---|
| | | | |
| | | | |
| | | | |
| | | | |

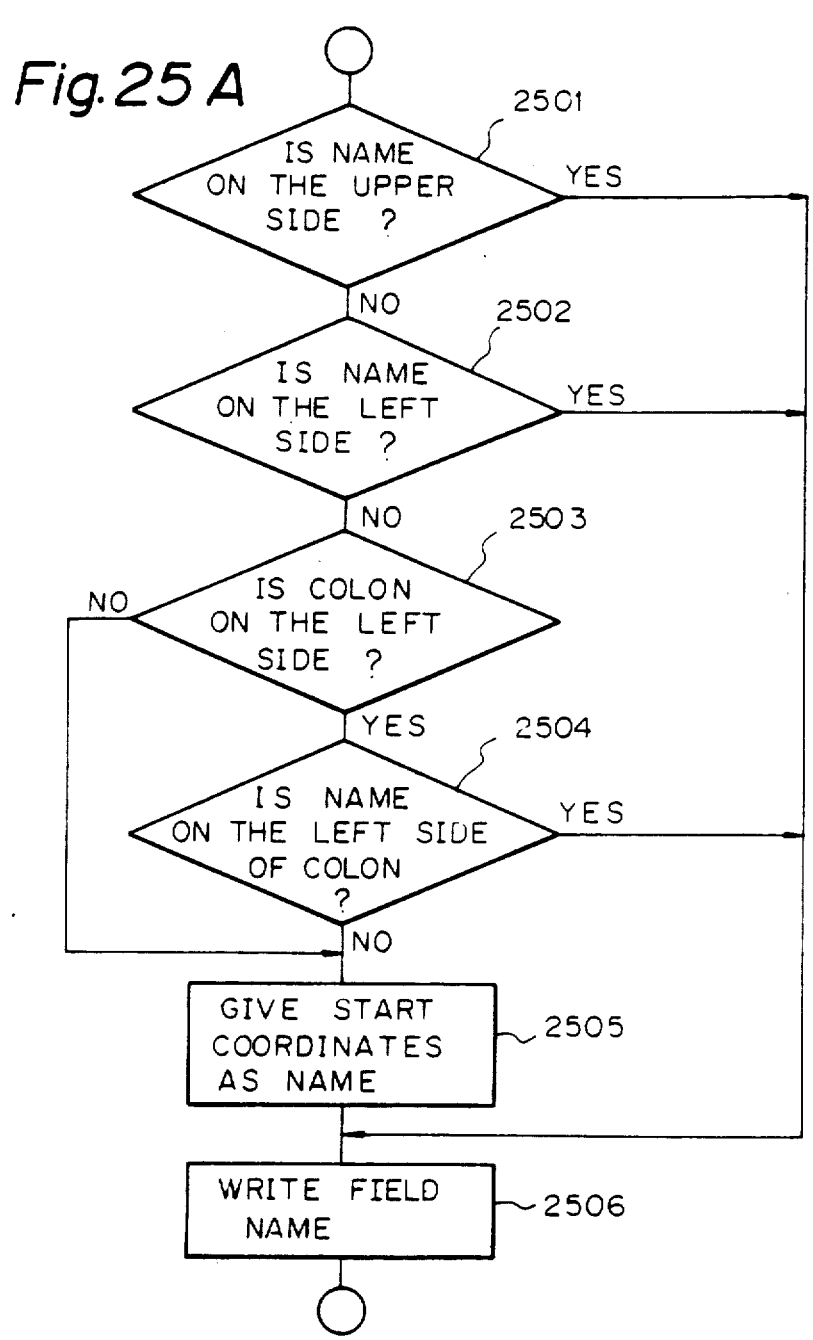

*Fig. 25B*
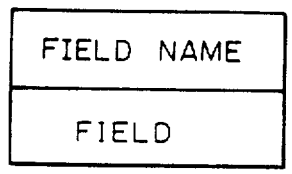
*Fig. 25C*
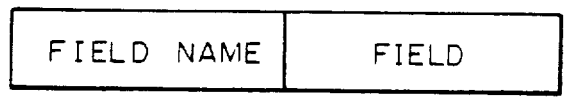
*Fig. 25D*
(FIELD NAME): FIELD
*Fig. 25E*
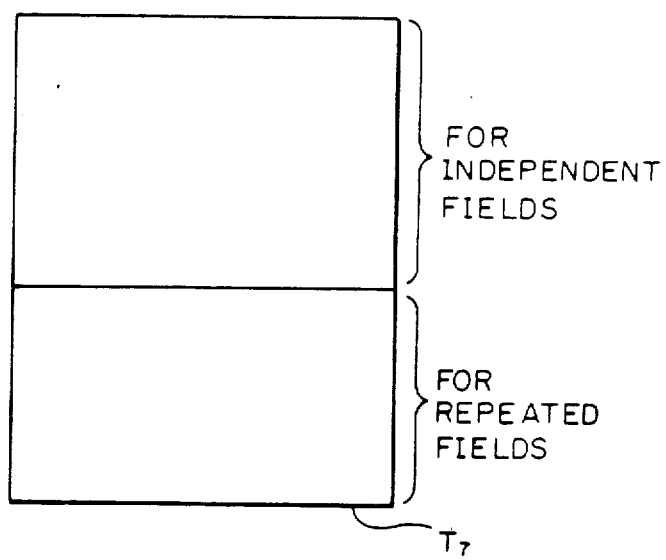

METHOD FOR OBTAINING COMMON MODE INFORMATION AND COMMON FIELD ATTRIBUTE INFORMATION FOR A PLURALITY OF CARD IMAGES

This is a continuation of co-pending application Ser. No. 540,682 filed on Oct. 11, 1983, now abandoned.

BACKGROUND OF THE INVENTION

1. Field of the Invention

The present invention relates to a method for obtaining common information and common field attribute information for a plurality of card images in a data processing system in which a card image is displayed on a display unit for processing the contents thereof.

2. Description of the Prior Art

In general offices, office workers store information in physical card systems, Progress in office automation, however, has led to proposals for the use of electronic card systems based on card images.

In such electronic card systems, information can be rapidly processed by word processing. That is, a card image can be displayed on a display unit and the necessary information added thereon.

In such systems, the form data which is identical on all cards is preferably not stored in addition to the individual data for each card, since this would enormously increase the amount of stored data. Therefore, cards having common form data are desireably grouped into so-called "boxes". Note that, as in the prior art, if each card format has to be made by a data specification statement including data name, data length, and data attributes such as character data a and numeric data, considerable amount of extra work is created for the worker.

SUMMARY OF THE INVENTION

It is an object of the present invention to provide a method for obtaining common information and common field attribute information for a plurality of card images grouped into a "box" to generate field definition tables, in which the preparation of a blank form is as simple as possible and the defined blank form is visually determined.

According to the present invention, fixed information (mode information) such as letters and frame lines, and field indicating information (field attribute information) for item data are written into a mode image buffer and simultaneously displayed on a display unit. The field indicating information is analyzed so as to make a field definition table, and a field name for each field is detected so as to make a field name table. The contents of the field definition table, and the field name table are sorted and merged so as to make a blank form.

BRIEF DESCRIPTION OF THE DRAWINGS

The present invention will be more clearly understood from the description as set forth below with reference to the accompanying drawings, wherein:

FIGS. 1 and 2 are diagrams of examples of blank forms according to the present invention;

FIG. 5 is a diagram of a mode image for making the blank form of FIG. 1;

FIG. 6A is a diagram of another mode image;

FIG. 6B is a diagram of a blank form made by the mode image of FIG. 6A;

FIG. 7A is a diagram of still another mode image;

FIG. 7B is a diagram of a blank form made by the mode image of FIG. 7A;

FIG. 8 is a block diagram of a data processing system according to the present invention;

FIG. 21A is a diagram of an example of a character field definition table used in a step of FIG. 20;

FIG. 21B comprised of 21B-1 and 21B-2 is a flowchart of the operation of the system of FIG. 8 for making the table of FIG. 21A;

FIG. 23 is a diagram of an example of an independent field definition table used a step of FIG. 20;

FIG. 24C is a diagram of an example of a numeric field definition table used in a step of FIG. 20;

FIG. 25A is a detailed flowchart of a step of FIG. 20;

FIGS. 25B, 25C, and 25D are diagrams explaining steps of FIG. 25A; and

FIG. 25E is a diagram of an example of a field name table used in a step of FIG. 20.

DESCRIPTION OF THE PREFERRED EMBODIMENT

In the present invention, information having a predetermined format is stored as a card image in a data processing system. During processing, this card image is displayed on a display unit.

A card image is formed by common form data, i.e., blank form data, and individual card data. The common blank form data and individual card data are stored separately in memory units or floppy disks and are merged and displayed on the display unit as occasion demands.

Figures 2, 21B:
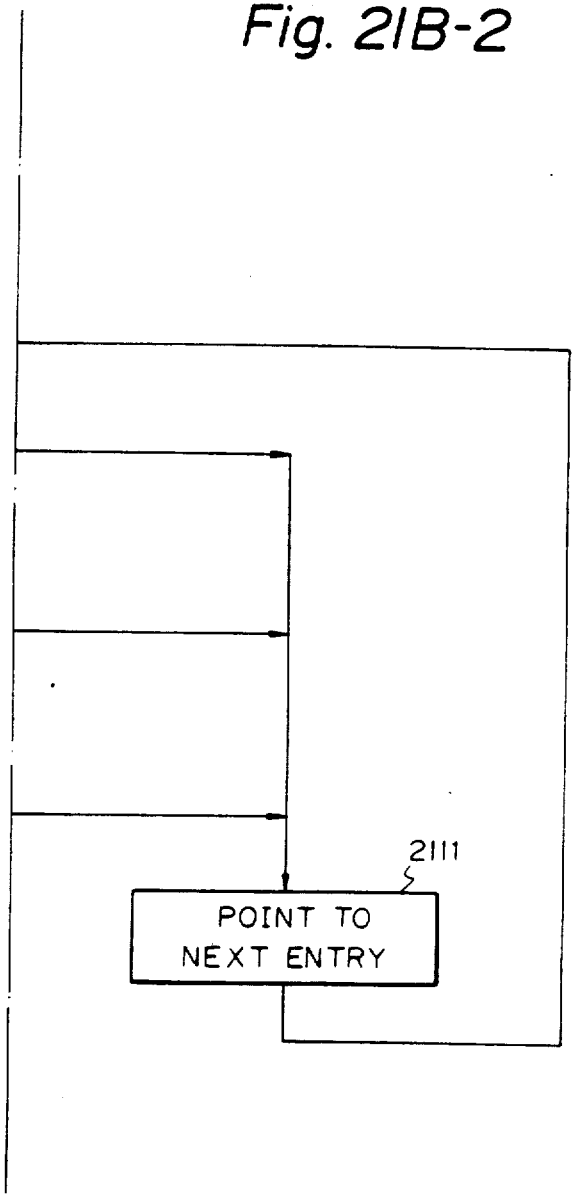

In FIGS. 1 and 2, which illustrate examples of blank forms "......" indicates a "character field", in which letters and other characters may be inserted, and "⊔⊔⊔,⊔⊔⊔" indicates a "numeric field", in which numerals may be inserted.

Figure 3:
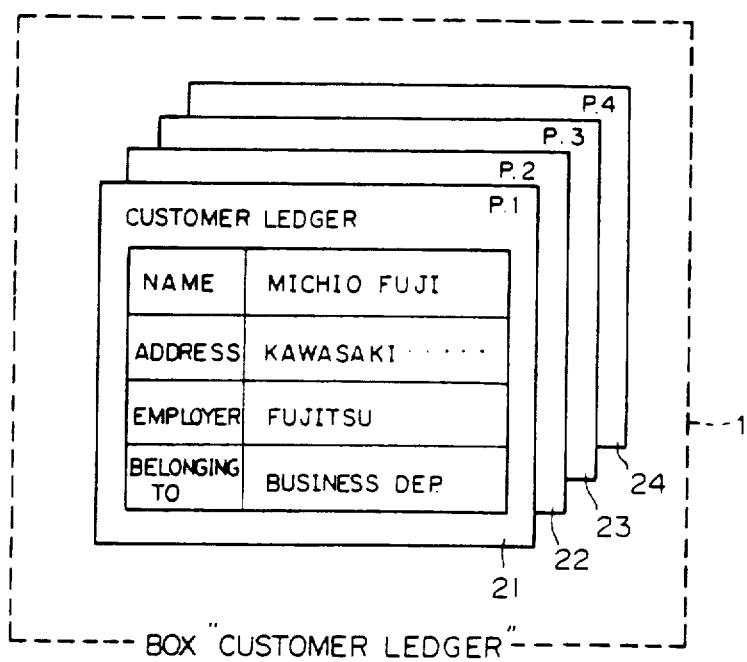
FIGS. 3 and 4 are diagrams of examples of "form boxes" according to the present invention.
Figure 4:
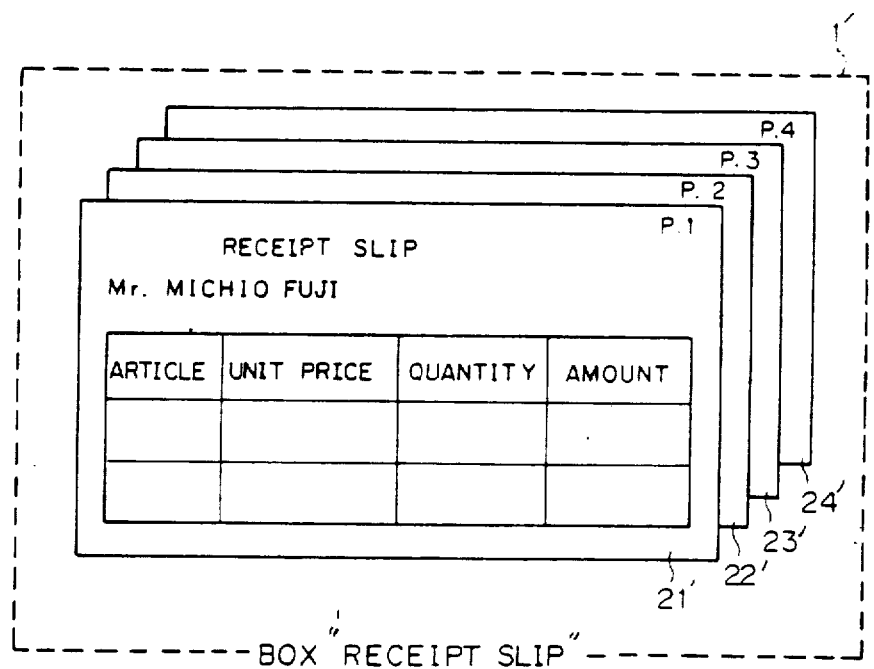

Since the number of card images having a common format as illustrated in FIG. 1 or 2 is generally large, the concept of a "box" is introduced. FIGS. 3 and 4 illustrate examples of boxes according to the present invention. In the figures, numerals 1 and 1' designate boxes, and numerals 21, 22, ..., 21', 22', ..., designate card images. In order to process a group of card images as a box, the following tables (or memory units) are prepared:

(i) Box profile table for storing the total length of fields, and the like.

(ii) Field definition information table for storing start coordinates of fields, attributes such as the presence or absence of a comma, and the like.

(iii) Field name table for storing names of fields.

(iv) Card data table for storing card data which will be written into the above-mentioned fields with a page number.

A card image is made by combining the contents of the above-mentioned tables.

According to the present invention, when making a character field, the field marks 37 "......" do not have to be inserted. Only a character field start mark " " and a character field end mark " " are necessary, as illustrated in FIG. 5, since such marks are translated by a program.

In addition, as illustrated in FIGS. 6A and 6B, a frame line surrounding each field is not always necessary. When a mode image as illustrated in FIG. 6A is determined, analysis is automatically performed so that a blank form as illustrated in FIG. 6B is displayed on the display unit for confirmation. Note that, in FIG. 6B, a character field is represented by marks ". . . . . .".

Also in the present invention, as illustrated in FIG. 7A, a table start mark " ▌ " can be added to the head of a first row of fields and a table end mark " ▼ " to the head of a second row of fields, whereupon fields having the same attributes as the first row are repeated, as shown in FIG. 7B. Such fields are defined as "repeated fields", while other fields are defined as "independent fields".

In FIG. 8, which illustrates a data processing system according to the present invention, reference numeral 81 designates a microprocessor unit (MPU); 82 a random access memory (RAM) for storing temporary data such as the above-mentioned tables; 83 a mode image buffer (60 rows×96 columns) for storing mode image data for making a blank form; 84 a read-only memory (ROM) for storing programs, constants, and the like; 85 a keyboard; 86 a keyboard control circuit; 87 a display unit (36 rows×48 columns); 88 an image buffer for storing the content of the display unit 87; 89 a character generator; 90 a display control circuit; 91 floppy disks; 92 a floppy disk control circuit; 93 an address bus; 94 a data bus; and 95 a clock generator for supplying clock signals to the MPU 81 and the like.

The operation of the data processing system of FIG. 8 will now be explained with reference to FIGS. 9 through 20. First, at step 901, an initialization is performed. That is, the mode image buffer 83 is cleared. Next, at step 902, a key or several keys of the keyboard 85 are pushed. As a result, the next operation will be performed in accordance with the pushed keys.

At step 903, the MPU 81 determines whether or not a " ┌ " key is pushed. If pushed, control is transferred to step 1001 of FIG. 10, in which the " ┌ " code is written into a location of the mode image buffer 83 corresponding to the location of a cursor (not shown) which is displayed on the display 87. Further, at step 1002, " ┐ " is displayed at the location of the cursor on the display 87. Then, control returns to step 902 of FIG. 9.

If the determination at step 903 is negative, control is transferred to step 904, in which the MPU 81 determines whether or not a " ╯ " key is pushed. If pushed, control is transferred to step 1101 of FIG. 11, in which the " ╯ " code is written into a location of the mode image buffer 83 corresponding to the location of the cursor. Further, at step 1102, " ┘ " is displayed at the location of the cursor on the display 87. Then, control returns to step 902 of FIG. 9.

If the determination at step 904 is negative, control is transferred to step 905, in which the MPU 81 determines whether or not a " ⌴ " key is pushed. If pushed, control is transferred to step 1201 of FIG. 12, in which the " ⌴ " code is written into a location of the mode image buffer 83 corresponding to the location of the cursor. Further, at step 1202, " ⌴ " is displayed at the location of the cursor on the display unit 87. At step 1203, the cursor is moved to the next location. Then, control returns to step 902 of FIG. 9.

If the determination at step 905 is negative, control is transferred to step 906. In this particular embodiment, there is provided a Japanese language processing function, wherein words are typed in by the phonetic "hiragana" cursive syllables and then, when necessary, "transformed" into the corresponding ideographic "kanji" characters. In step 906, the MPU 81 determines whether or not "hiragana" keys are pushed. If pushed, the MPU 81 processes a sequence of "hiragana" at step 906'. Then, control is transferred to step 907, FIG. 9B, which determines whether or not a transformation key is pushed. If the determination at step 907 is negative, control is transferred to step 908, which determines whether or not a non-transformation key is pushed.

If the transformation key is pushed, control is transferred from step 907 to step 1301, in which the MPU 81 performs a "hiragana"-to-"kanji" transformation upon the "hiragana" inputted into the image buffer 88. As a result, the codes of transformed "kanji" are written into the mode image buffer 83. Simultaneously, the "kanji" are displayed on the display unit 87. Then, control returns to step 902 of FIG. 9.

The "hiragana"-to-"kanji" transformation will now be explained briefly. Note that, before pushing the transformation key, the written "hiragana" is displayed with a high brightness on the display unit 87. Then, when the transformation key is pushed, a corresponding word ("kanji") is searched from a dictionary floppy disk of the floppy disks 91 in accordance with the inputted "hiragana". When a corresponding word is detected, the word is displayed with a low brightness on the display unit 87 and, simultaneously, the "hiragana" disappears from the display unit 87. Then, when a confirmation key is pushed, the code of the corresponding word is written into the mode image buffer 83 and the cursor is moved to a next location of the display unit 87.

Note that the above-mentioned special marks, such as " ╱ " and " ▌ ", are inputted by using the "hiragana"-to-"kanji" transformation function.

Figure 14:
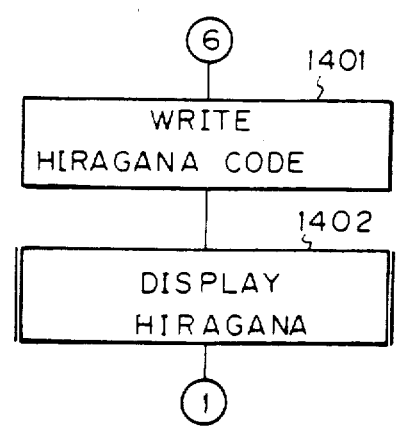
Figure 15:
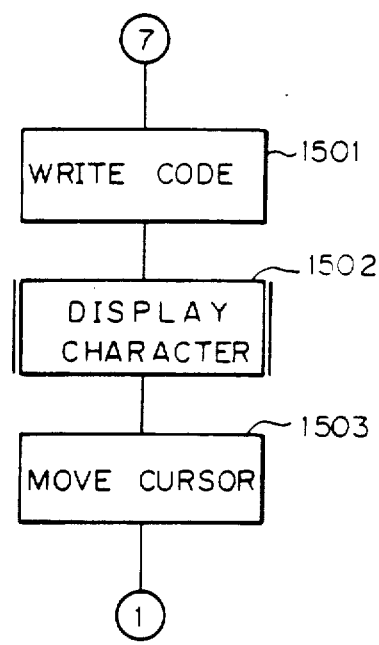
Figure 16:
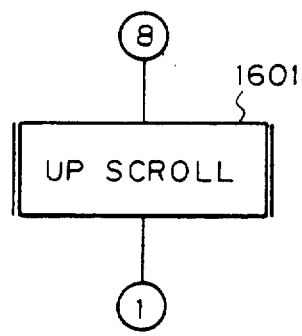
Figure 17:
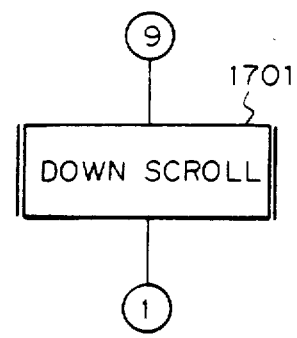

Returning to FIG. 9, when a non-transformation key is pushed, control is transferred from step 908 to step 1401 of FIG. 14, in which the MPU 81 writes the codes of the "hiragana" inputted to the image buffer 88 into the mode image buffer 83. In addition, at step 1402, the "hiragana" are displayed with a low brightness on the display unit 87. Then, control returns to step 902 of FIG. 9.

Note that, when both determinations at steps 907 and 908 are negative, control returns to step 902. However, in this case, other "hiragana" keys will be pushed. This ends the Japanese language processing function.

If the determination at step 906 is negative, control is transferred to step 909, in which the MPU 81 determines whether or not alphanumeric keys (and/or "katakana" (other Japanese syllable keys)) are pushed. If so, control is transferred to step 1501 of FIG. 15 in which the MPU 81 writes the corresponding codes into the mode image buffer 83. Then, at step 1502, these alphanumeric (and/or katakana) characters are displayed on the display 87. Then, at step 1503, the cursor is moved to a next location of the display unit 87, thereby returning control to step 902 of FIG. 9.

If the determination at step 909 is negative, control is transferred to step 910, in which the MPU 81 determines whether or not a next row key is pushed. If pushed, control is transferred to step 1601 of FIG. 16 in which the MPU 81 performs an up-scrolling operation upon the image buffer 88, i.e., the content of the display unit 87. Then, control returns to step 902 of FIG. 9.

If the determination at step 910 is negative, control is transferred to step 911, in which the MPU 81 determines whether or not a previous row key is pushed. If so, control is transferred to step 1701 of FIG. 17, in which the MPU 81 performs a down-scrolling operation upon the image buffer 88, i.e., the content of the display 87. Then, control returns to step 902 of FIG. 9.

Figure 9B:
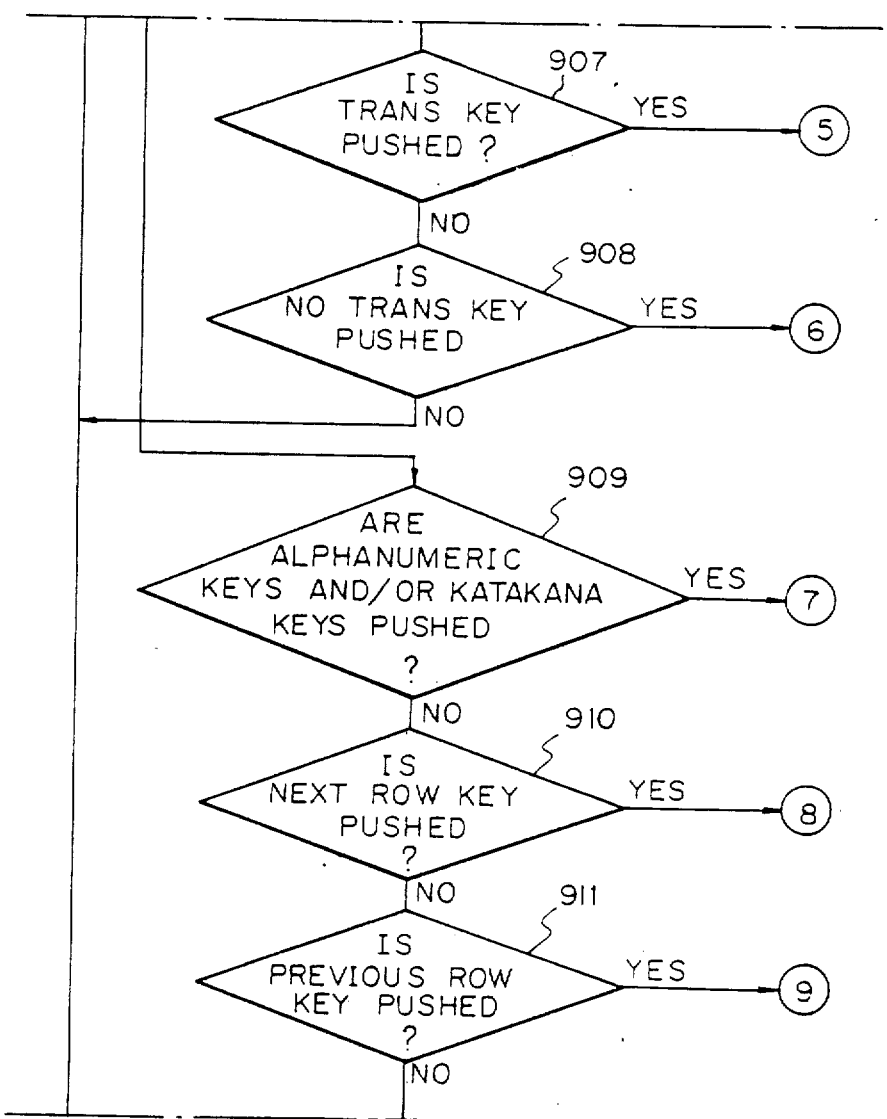
FIG. 9 comprised of 9A–9C, and 10–20 are flowcharts of the operation of the system of FIG. 8.
Figure 9C:
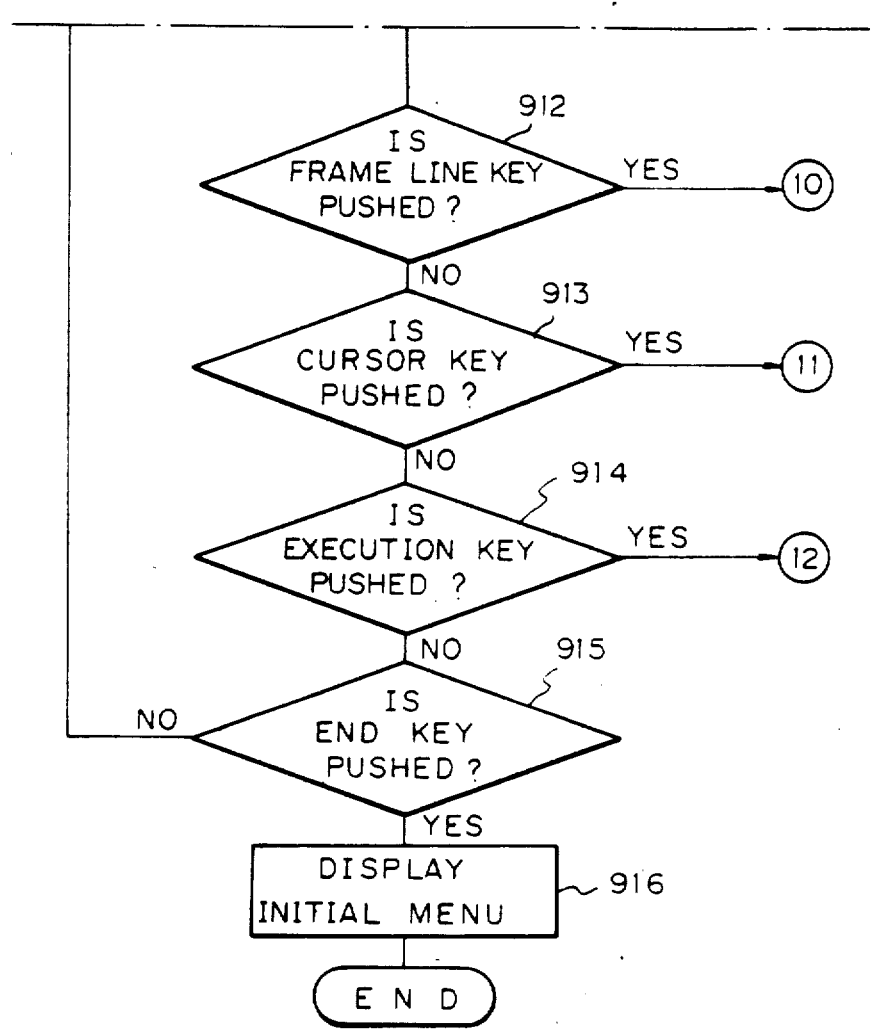
Figure 10:
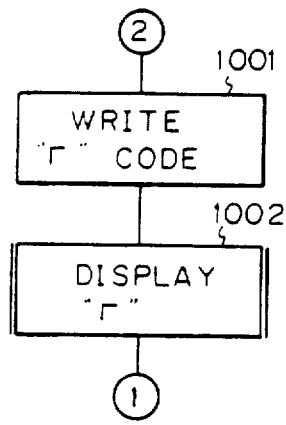
Figure 11:
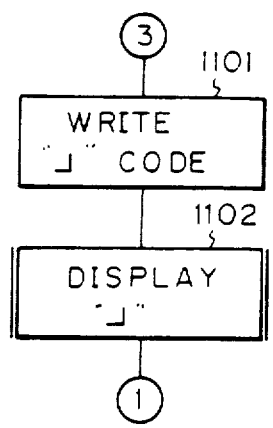
Figure 12:
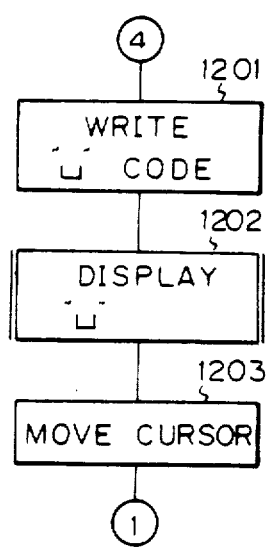
Figure 13:
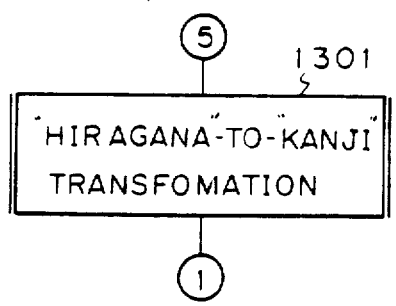

If the determination at step 911 is negative, control is transferred to step 912, FIG. 9C, in which the MPU 81 determines whether or not a frame line key is pushed. If pushed, control is transferred to step 1801 of FIG. 18, in which the MPU 81 reads the present location of the cursor on the display unit 87. Then, at step 1802, the MPU 81 searches for a frame line code in accordance with the direction of the cursor and the present frame line code. At step 1803, the MPU 81 writes a searched frame line code into the mode image buffer 83. At step 1804, the searched frame line is displayed on the display unit 87. Next, at step 1805, the cursor is moved to a next location of the display unit 87 by pushing a cursor key. Thus, the above-mentioned steps 1801 through 1804 are repeated. Finally, control returns to step 902 of FIG. 9.

If the determination at step 912 is negative, control is transferred to step 913 in which the MPU 81 determines whether or not the cursor key is pushed. If pushed, control is transferred to step 1901 of FIG. 19, in which the cursor is moved. Thus, control returns to step 902 of FIG. 9.

If the determination at step 913 is negative, control is transferred to step 914, in which an execution key is pushed. If pushed, control is transferred to step 2001 of FIG. 20.

At step 2001, the MPU 81 performs analysis of the data of the mode image buffer 83 so as to make various tables, i.e., an independent field definition table, and a repeated field definition table. That is, the MPU 81 searches for variable information such as character data and numeric data from the mode image buffer 83 so as to make the independent field definition and the repeated field definition table. Then, at step 2002, a field name for each field is detected from the fixed information, so as to make a field name table. Then, at step 2003, confirmation is made in accordance with the display unit 87. As a result, when an error occurs, the operator performs an appropriate correcting operation. However, when no error occurs, at step 2004, the execution key is pushed, and, as a result, at step 2005, the content of each table is moved from the RAM 82 to the floppy disks 91, thereby completing this routine.

Returning to FIG. 9, if the determination at step 914 is negative, control is transferred to step 915, in which the MPU 81 determines whether or not an end key is pushed. If pushed, control is transferred to step 916, in which an initial menu having a plurality of instructions is displayed on the display unit 87. If not, control returns to step 902.

Figure 20:
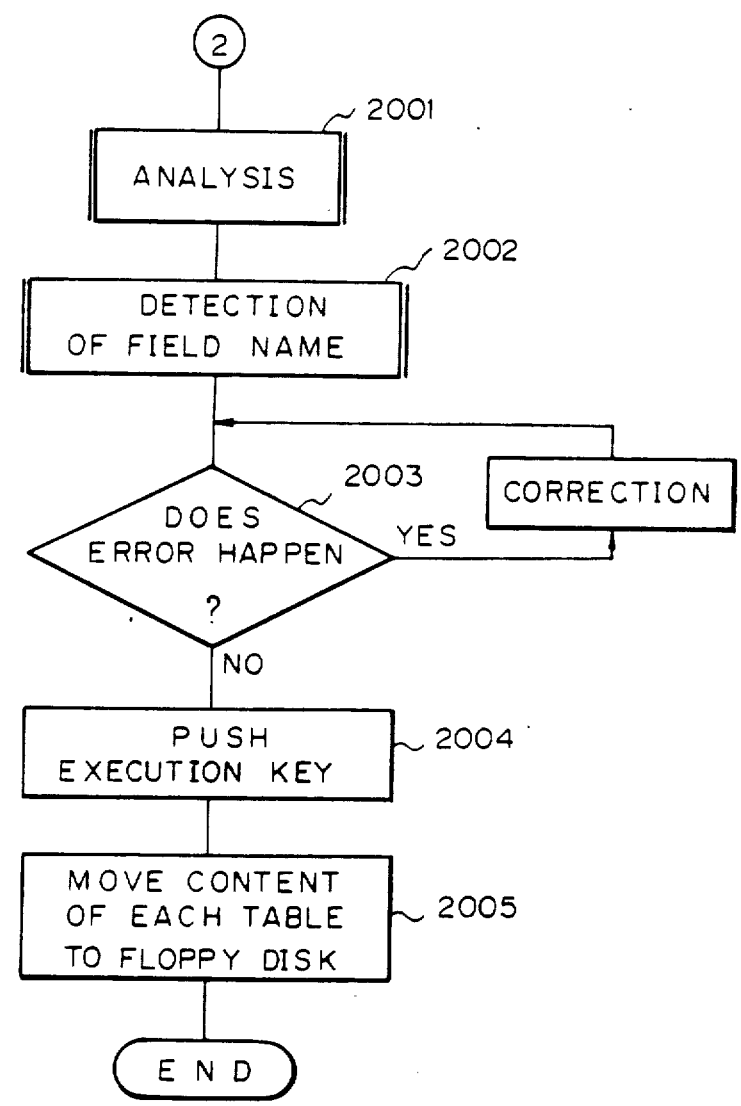

The analysis step 2001 of FIG. 20 will now be explained in more detail. Before making the independent field definition table, a character field definition table and a numeric definition table are prepared. An example of the character field definition table is given in FIG. 21A. This table $T_1$ is made by the process of the flowchart of FIG. 21B, which will be explained below.

Figure 21C:
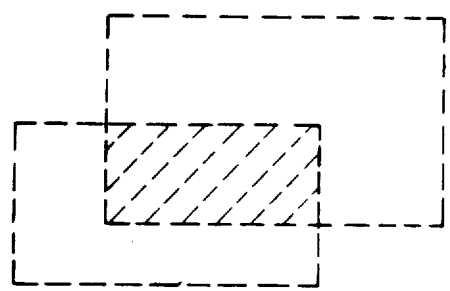
FIG. 21C is a diagram explaining a step of FIG. 21B.

At step 2101, the MPU 81 determines whether or not there is a character field start mark "〈". If there is, at step 2102, the MPU 81 stores the coordinates, such as (12, 1), in the corresponding location of the table of FIG. 21A, which is provided in the RAM 82 of FIG. 8. In this case, a space entry pointer $P_1$ points to a second entry. Then, at step 2103, the pointer $P_1$ is counted up. If the determination at step 2101 is negative, control is transferred to step 2104, in which the MPU 81 determines whether or not there is a character field end mark "↲". If there is, at step 2105, the space entry pointer $P_1$ is caused to point to a first entry. By steps 2106 and 2111, the space entry pointer $P_1$ points to a first incomplete entry. After that, at step 2107, the MPU 81 determines whether or not the location of "↳" is reasonable. That is, in the same entry, the location of "↲" must be to the right side of "↰" and lower than or equal to of "↱". For example, in the second entry of FIG. 21A, $X_2 > 12$ and $Y_2 \geq 1$ must be satisfied. If the determination at step 2107 is negative, control is transferred to step 2111, which counts up the content of the space entry pointer $P_1$, while if the determination at step 2107 is affirmative, control is transferred to step 2108. At step 2108, the MPU 81 determines whether or not any adjacent character fields intersect. Such an intersection is illustrated in FIG. 21C. If the determination at step 2108 is affirmative, control is transferred to step 2110 so that the space entry pointer $P_1$ is counted up. Otherwise, at step 2109, the MPU 81 writes the coordinates of "↳" into the character field table of FIG. 20. Then, at step 2110, the complete flag of the corresponding entry is changed from "0" to "1".

Figure 22:
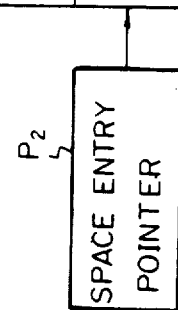
FIG. 22 is a diagram of an example of a numeric field definition table used a step of FIG. 20.

An example of the numeric field definition table $T_2$ is given in FIG. 22. That is, when a numeric field such as ⊔⊔⊔, ⊔⊔⊔ is searched, the MPU 81 writes the start coordinates, the length, the presence or absence of comas, and any decimal places into the locations of the numeric field table $T_2$ indicated by a space entry pointer $P_2$. After one entry is completed, the space entry pointer $P_2$ is counted up and the MPU 81 again searches another numeric field.

The contents of character field definition table $T_1$ and the numeric field definition table $T_2$ are sorted and merged into an independent field definition table $T_3$ as illustrated in FIG. 23.

Figures 24A, 24B:
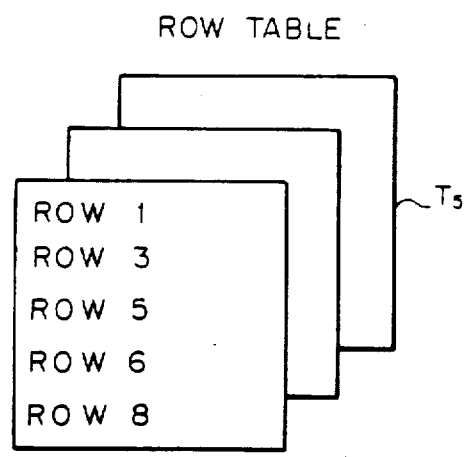
FIG. 24A is a diagram of an example of a start/end table used in a step of FIG. 20.
FIG. 24B is a diagram of an example of a row table used in a step of FIG. 20.

Before making the repeated field definition table, a start/end table $T_4$ of FIG. 24A and a repeated row table $T_5$ of FIG. 24B are made. That is, when a table start mark "◀" is searched, the MPU 81 writes the coordinates thereof into the corresponding location of the table $T_4$ of FIG. 24A. When a table end mark "▲" is searched, the MPU 81 writes the coordinates thereof into the corresponding location of the table $T_4$. At this time, the MPU 81 writes the row numbers between the two marks into the table $T_5$ of FIG. 24B. Then, the contents of the start/end table $T_4$ and the row table $T_5$ are merged into the repeated field definition table $T_6$. In this case, the content of the character field definition table $T_1$ or the numeric field definition table $T_2$ belonging to the table start mark "◀" is also merged into the repeated field definition table $T_6$.

In FIG. 24C, a Y-direction attribute list corresponds to the table $T_5$ of FIG. 24B, and an X-direction attribute list corresponds to the content of the table $T_1$ or $T_2$ belonging to the table start mark "◀".

The detection of a field name for each field at step 2002 of FIG. 20 will now be explained in more detail with reference to FIG. 25. First, at step 2501, the MPU 81 determines whether or not a field name is located within the fixed information surrounded by a frame line on the upper side of each field. If so, at step 2506, the MPU 81 writes a field name into a field name table T₇ as illustrated in FIG. 25E. In this case, the relationship between a field and its name is illustrated in FIG. 25B. If the determination at step 2501 is negative, control is transferred to step 2502, in which the MPU 81 determines whether or not a field name is located with the fixed information, surrounded by a frame line, on the left side of each field. If so, control is transferred to step 2506. In this case, the relationship between a field and its name is illustrated in FIG. 25C. If the determination at step 2502 is negative, control is transferred to step 2503, in which the MPU 81 determines whether or not a colon is located on the left side of each field. If so, control is transferred to step 2504, in which the MPU 81 determines whether or not a field name is located on the left side of the colon. If so, control is transferred to step 2506. In this case, the relationship between a field and its name is illustrated in FIG. 25D. If the determination at step 2503 or 2504 is negative, control is transferred to step 2505 in which the MPU 81 gives the start coordinates of each field as the name thereof.

The names of repeated fields are defined by adding the row numbers (See FIG. 24B) to the name of the corresponding independent fields.

When a card image is made by using the above-mentioned blank form, the data of the blank form is transferred from the floppy disk 92 to the RAM 83 of FIG. 8, and simultaneously, part of the blank form is displayed on the display unit 87. In this state, card data is written into a character or numeric field of the display unit 87 in which the cursor is located. Once a piece of card data is written into a character or numeric field, the cursor is automatically moved to a next character or numeric field.

We claim:

1. A method for obtaining common mode information and common field attribute information for a plurality of card images belonging to a "box" to generate field definition tables, each card image having at least one field with each field including corresponding mode information and field attribute information, in a data processing system having a mode image buffer and a display unit for displaying at least part of said mode image buffer, said method comprising the steps of:
    writing the mode information and field attribute information of said at least one field of said card image into said mode image buffer;
    analyzing said corresponding mode information and said field attribute information of said at least one field of said card image written into said mode image buffer; to discriminating said corresponding field attribute information from said corresponding mode information; and automatically generating field definition tables at least as to the position of said at least one field, the attribute of said at least one field, and the length of said at least one field specified by start and end field position indicators based upon said corresponding field attribute information of said at least one field.

2. A method as set forth in claim 1, further comprising the step of detecting a field name of said at least one field of said field definition information tables from said corresponding mode information of said at least one field written into said mode image buffer to make a field name table.

3. A method as set forth in claim 2 wherein said at least one field has an upper side and a left side, and wherein said detecting step comprises the sub-steps of:

determining whether or not said field name is located within said corresponding mode information on the upper side of each field;
    determining whether or not said field name is located within said corresponding mode information on the left side of each field when no field name is located on the upper side of each field;
    determining whether or not said field name associated with a colon on the right side thereof is located at the left side of each field when no field name is located at the left side of each field; and
    giving the coordinates of each field as a field name when no field name associated with a colon is located on the left side of each field.

4. A method as set forth in claim 2, wherein said writing step comprises the step of writing a field start mark and a field end mark for one character field into said mode image buffer so as to form a rectangular area for said character field.

5. A method as set forth in claim 2, wherein said writing step comprises the step of writing numeric marks for one numeric field into said mode image buffer.

6. A method as set forth in claim 2, wherein said writing step comprises the step of writing a table start mark and a table end mark for repeating a line of fields following said table start mark from said table start mark to said table end mark.

7. A method for obtaining common mode information and common field attribute information for a plurality of card images belonging to a "box" to generate field definition tables, each card image having at least one field with each field including corresponding mode information and field attribute information, in a data processing system having a mode image buffer and a display unit for displaying at least part of said mode image buffer, said method comprising the steps of:
    writing the mode information and field attribute information of said at least one field of said card image into said mode image buffer;
    analyzing said corresponding mode information and said field attribute information of said at least one field of said card image written into said mode image buffer; discriminating said corresponding field attribute information from said corresponding mode information; automatically generating field definition tables at least as to the position of said at least one field, the attribute of said at least one field, and the length of said at least one field by start and end field position indicators based upon said corresponding field attribute information of said at least one field; and
    performing a "hiragana"-to-"kanji" transformation upon said corresponding mode information of said at least one field.

8. A method for obtaining common mode information and common field attribute information for a plurality of card images belonging to a "box" to generate field definition tables, each card image having at least one field with each field including corresponding mode information and field attribute information, in a data processing system having a mode image buffer and a display unit for displaying at least one part of said mode image buffer, said method comprising the steps of:
    writing the mode information and field attribute information of said at least one field of said card image into said mode image buffer;

analyzing said corresponding mode information and said field attribute information of said at least one field of said card image written into said mode image buffer; to discriminating said corresponding field attribute information from said corresponding mode information; automatically generating field definition tables at least as to the position of said at least one field, the attribute of said at least one field, and the length of said at least one field by start and end field position indicators based upon corresponding field attribute information of said at least one field;

determining whether a field name is located within said corresponding mode information on a left side of each field when no field name is located on the upper side of each field;

determining whether a field name associated with a colon on a right side thereof is located at the left side of each field when no field name is located at the left side of each field; and providing the coordinates of each field with a field name when no field name is associated with a colon located on the left side of the field.

* * * * *

UNITED STATES PATENT AND TRADEMARK OFFICE
CERTIFICATE OF CORRECTION

PATENT NO. : 4,677,585

DATED : June 30, 1987                               Page 1 of 2

INVENTOR(S) : Ikegami et al.

It is certified that error appears in the above-identified patent and that said Letters Patent is hereby corrected as shown below:

Column 1, line 19, "systems," should be --systems.--;

line 34, delete "a"; after "data," (second occurrence) insert --a--.

Column 2, line 68, "37" should be --"--.

Column 3, line 1, """ """ should be --"⌐"--;

line 2, """ """ should be --"⌙"--;

line 13, "'/" should be --▼--;

line 14, "▼" should be --▲--;

line 47, "ↄ" should be --"⌐"--;

line 52, "∨" should be --"⌙"--;

line 54, "Y" should be --"⌙"--.

Column 4, line 39, """/" and "▮ """ should be --"▼" and "▲"--.

Column 5, line 67, "<" should be --"⌐"--.

Column 6, line 8, """>""" should be --"⌙"--;

line 12, """∨""" should be --"⌙"--;

line 13, """>""" should be --"⌙"--;

line 14, """∧""" should be --"⌐"--;

UNITED STATES PATENT AND TRADEMARK OFFICE
CERTIFICATE OF CORRECTION

PATENT NO. : 4,677,585
DATED : June 30, 1987
INVENTOR(S) : Ikegami et al.

Page 2 of 2

It is certified that error appears in the above-identified patent and that said Letters Patent is hereby corrected as shown below:

line 15, ""√"" should be --"⌈"--;

line 26, ""∠"" should be --"⌐"--;

line 46, ""◀"" should be --"▶"--;

line 57, ""◀"" should be --"▼"--;

line 62, "▮" should be --"▼"--.

Column 7, line 51, delete "to" and begin a new paragraph;

line 53, after "and" begin a new paragraph;

line 66, "2" should be --2,--.

Column 9, line 4, delete "to" and begin a new paragraph;

line 6, after "information;" begin a new paragraph.

Signed and Sealed this

First Day of March, 1988

*Attest:*

DONALD J. QUIGG

*Attesting Officer*      *Commissioner of Patents and Trademarks*